US008175176B2

(12) United States Patent
Akahori

(10) Patent No.: US 8,175,176 B2
(45) Date of Patent: May 8, 2012

(54) FFT WINDOW SPREAD GENERATING METHOD

(75) Inventor: Hiroji Akahori, Tokyo (JP)

(73) Assignee: Lapis Semiconductor Co., Ltd. (JP)

( * ) Notice: Subject to any disclaimer, the term of this patent is extended or adjusted under 35 U.S.C. 154(b) by 1196 days.

(21) Appl. No.: 11/905,004

(22) Filed: Sep. 27, 2007

(65) Prior Publication Data

US 2008/0095289 A1 Apr. 24, 2008

(30) Foreign Application Priority Data

Oct. 23, 2006 (JP) ................................ 2006-287152

(51) Int. Cl.
*H04B 1/10* (2006.01)
*H04J 11/00* (2006.01)

(52) U.S. Cl. ....................................... 375/260; 370/210

(58) Field of Classification Search .......... 375/260–262, 375/265; 370/208, 210; 708/403–405
See application file for complete search history.

(56) References Cited

U.S. PATENT DOCUMENTS 7,599,327 B2 * 10/2009 Zhuang ......................... 370/329
2003/0117943 A1 * 6/2003 Sakata et al. .................. 370/210
2008/0304587 A1 * 12/2008 Setoh et al. ................... 375/260

FOREIGN PATENT DOCUMENTS

JP 10-075229 3/1998
JP 2002-280995 A 9/2002
JP 2008-537424 A 9/2008

OTHER PUBLICATIONS

Official Notice of Reason for Rejection dated on Oct. 3, 2008 Patent Application No. 2006-287152 with English Translation.

* cited by examiner

*Primary Examiner* — Young T. Tse
(74) *Attorney, Agent, or Firm* — Studebaker & Brackett PC; Donald R. Studebaker

(57) ABSTRACT

The present invention provides an FFT window spread generating method used in the modulation of an OFDM system. When OFDM-modulated received signals each having a time length greater than or equal to an effective symbol length are demodulated by FFT processing using a spread FFT window, the spread FFT window makes use of received signals each having the time length greater than or equal to the effective symbol length. Spreading windows spread before and/or after the effective symbol length are provided. Received signals lying within the spreading windows are added to their corresponding received signals lying within the effective symbol length and different in time position by the effective symbol length, and the amplitudes of the added received signals are reduced to half respectively, thereby generating the spread FFT window.

6 Claims, 4 Drawing Sheets

Prior Art

FFT WINDOW SPREAD GENERATING METHOD

BACKGROUND OF THE INVENTION

The present invention relates to an FFT window spread generating method for generating a spread FFT window corresponding to an FFT analysis interval used upon demodulating each received signal modulated in accordance with an OFDM (Orthogonal Frequency Division Multiplex) modulation system by FFT (Fast Fourier Transform).

An OFDM system which transmits a plurality of orthogonal subcarriers (carriers) simultaneously as hitherto, can be used in various applications such as a terrestrial digital television broadcasting system (hereinafter called merely "digital terrestrial broadcasting") and the like as described in, for example, a patent document (Japanese Unexamined Patent Publication No. Hei 10(1998)-75229).

FIG. 4 is a diagram showing a frame configuration of a transmission signal used in a conventional OFDM system described in the patent document 1 or the like. A demodulating method of the conventional OFDM system will be explained below with reference to FIG. 4.

Each of transmission symbols SBs is constituted of a guard interval (also called "cyclic prefix") GI and an effective OFDM symbol (hereinafter called simply "effective symbol") S. The guard interval GI is equivalent to one in which a rear portion Sa of a time waveform of the effective symbol S is extracted and copied onto its head.

In digital transmission using the OFDM system, when distortion and a multipath exist in a transmission line, the orthogonality of a received signal suffers damage or loss and is hence disturbed, so that inter symbol interference (hereinafter called "ISI") occurs in a demodulated signal, thus causing degradation in error rate. In order to solve this, part of transmission energy (transmission power) is sacrificed, data about a rear portion (corresponding to a period from a few tenth of a whole effective symbol to a fraction thereof) Sa of the effective symbol S desired to be transmitted essentially is used before the effective symbol S, and a guard interval GI for ISI absorption, which is ineffective or invalid as a buffer data portion, is provided. Providing such a guard interval GI enables satisfactory reception without causing ISI if, event though a delayed wave reflected by an obstacle exists in addition to a direct wave, the amount of its delay is shorter than each guard interval GI.

When the transmit signal having such a configuration is sent to the receiving side, the receiving side ignores information of each guard interval GI. Thus, even when a delay occurs only in a given carrier, the delay is ignored if it falls within the guard interval GI, so that the transmit signal can properly be received. Since the data about the rear portion Sa of the effective symbol S is copied onto the corresponding guard interval GI in particular, no information is omitted even though the given carrier is shifted.

Therefore, in the conventional demodulating method, each guard interval GI is removed for every transmission symbol SB from the received OFDM transmission signal by a guard interval removing unit to extract only the effective symbol S. Each extracted effective symbol S is fast discrete Fourier-transformed by an FFT unit, followed by its demodulation.

In the demodulating method of the OFDM system described in the conventional patent document 1 or the like, only the effective symbol S is extracted from the transmission symbol SB with the guard interval GI added thereto and is subjected to fast discrete Fourier-transform, followed by its demodulation. A received signal waveform equivalent to the same length as the guard interval GI is not used. Therefore, power efficiency corresponding to the guard interval GI being transmitted is reduced. However, the related art encountered difficulties in solving the reduction in power efficiency.

SUMMARY OF THE INVENTION

The present invention has been made in view of the foregoing. An object of the present invention is to provide an FFT window spread generating method capable of improving a reception characteristic or the like thereby to enhance power efficiency corresponding to a guard interval GI being transmitted.

According to one aspect of the present invention, for attaining the above object, there is provided an FFT window spread generating method used in the modulation of an OFDM system, comprising the step of, when OFDM-modulated received signals each having a time length greater than or equal to an effective symbol length are demodulated by FFT processing using a spread FFT window, combining the received signals located before and/or after the effective symbol length by an arithmetic operation to generate the spread FFT window.

According to the FFT window spread generating method of the present invention, since received signals corresponding to spreading windows are used, a reception characteristic can be improved. Further, fading resistance can be enhanced. It is thus possible to improve power efficiency corresponding to a guard interval GI being transmitted.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

An FFT window spread generating method used in the modulation of an OFDM system comprises the step of, when OFDM-modulated received signals each having a time length greater than or equal to an effective symbol length are demodulated by FFT processing using a spread FFT window, using the received signals each having the time length greater than or equal to the effective symbol length, providing spreading windows spread before and/or after the effective symbol length, adding together received signals lying within the spreading windows to the received signals which correspond to received signals lying within the effective symbol length and are different in time position by the effective symbol length, and reducing the amplitudes of the added received signals to half respectively, thereby generating the spread FFT window.

Preferred embodiments of the present invention will hereinafter be described with reference to the accompanying drawings.

First Preferred Embodiment

Figure 2:
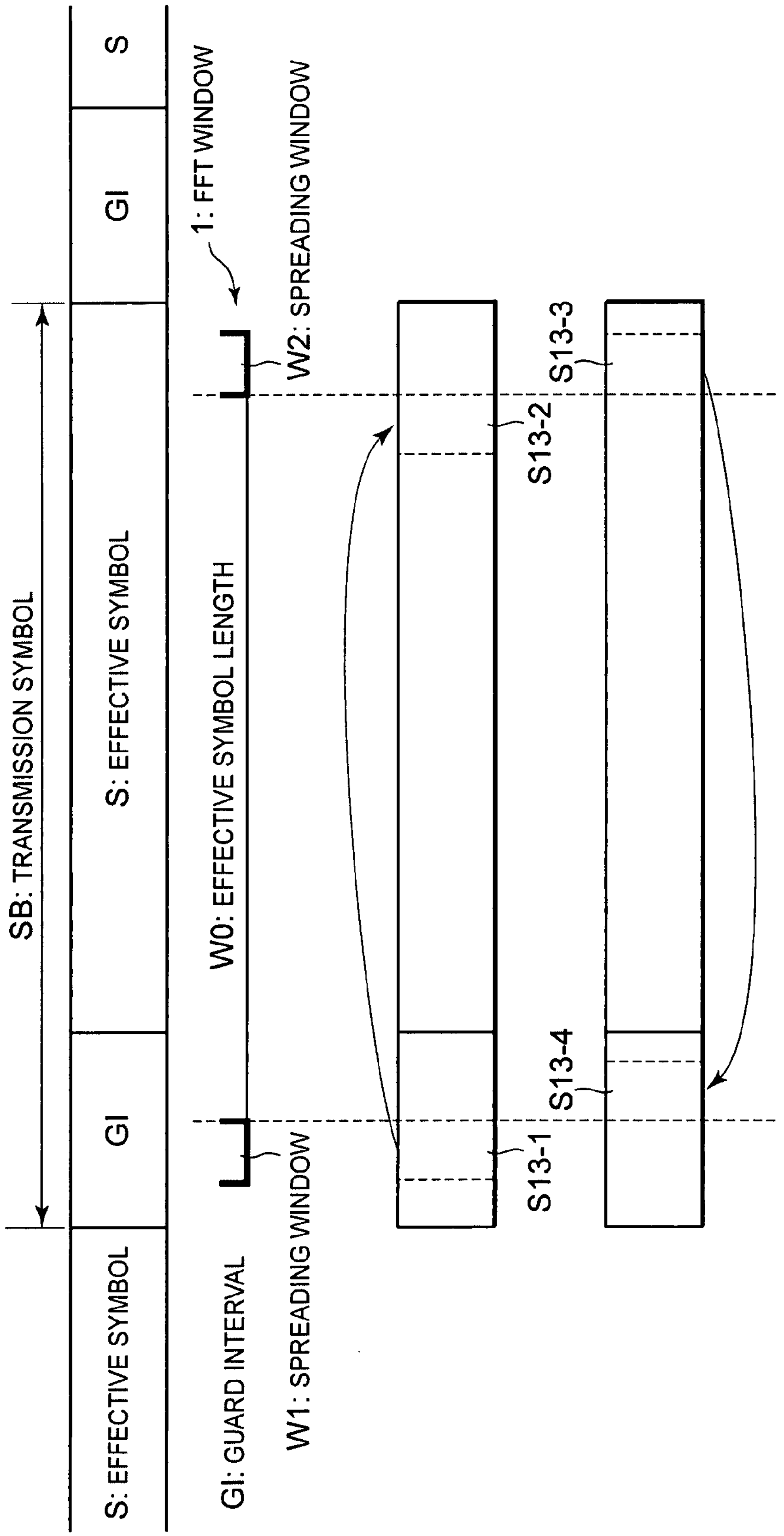
FIG. 2 is a frame configuration diagram of a transmission signal employed in an OFDM system showing a first embodiment of the present invention.

FIG. 2 is a frame configuration diagram of a transmission signal employed in an OFDM system showing a first embodiment of the present invention.

Figure 4:
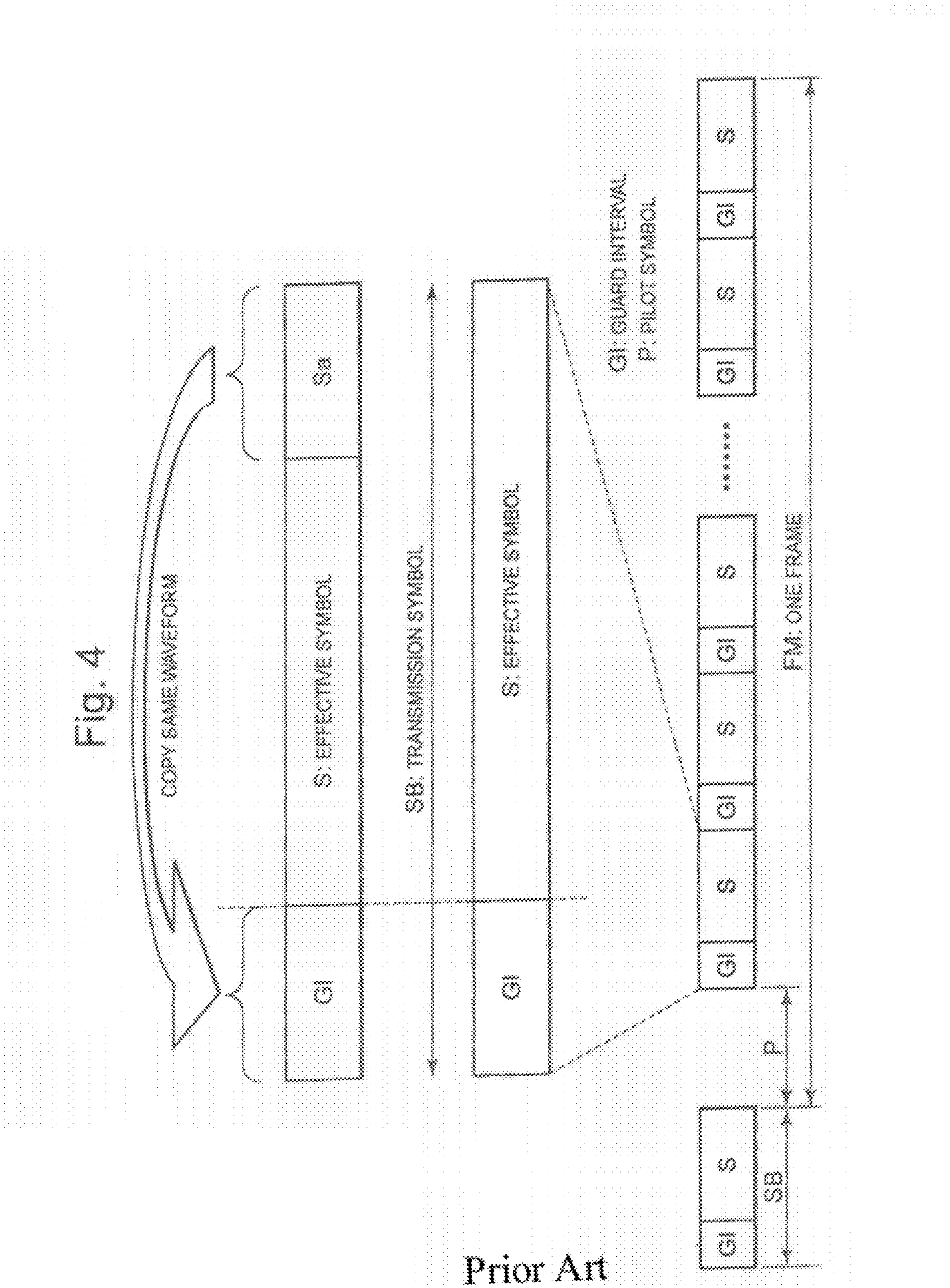
FIG. 4 is a diagram illustrating a frame configuration of a transmission signal employed in a conventional OFDM system.

A frame configuration of the transmission signal is similar to the conventional frame configuration shown in FIG. 4. In the frame configuration thereof, a plurality of transmission symbols SBs that constitute a transmit signal (transmission signal) modulated in, for example, an OFDM system are put together to constitute one frame. A pilot symbol for synchronous detection is inserted into the head of one frame. The pilot symbol indicates a signal-free period. A symbol reference signal can be generated on the receiving side using such a signal. Each of the transmission symbols SBs is constituted of a guard interval GI and an effective symbol S. Each guard interval GI is equivalent to one in which the rear portion of a time waveform of the effective symbol S is extracted and copied onto its head.

The feature of the first embodiment is an FFT window spreading method for storing each receive signal equivalent to a time length greater than or equal to the effective symbol S into a memory and generating an FFT input signal using each receive signal (i.e., an expanded or spread FFT window 1 added with expansion or spreading windows W1 and W2 at the head and end of an effective symbol length W0) corresponding to a portion expanded or spread over or beyond the time length of the effective symbol S by an FFT window generating arithmetic operation on the basis of each receive signal stored in the memory.

A demodulating apparatus of an OFDM system using the present FFT window spreading method and its modulating method will be explained below.

Demodulating Apparatus of First Embodiment

Figure 1:
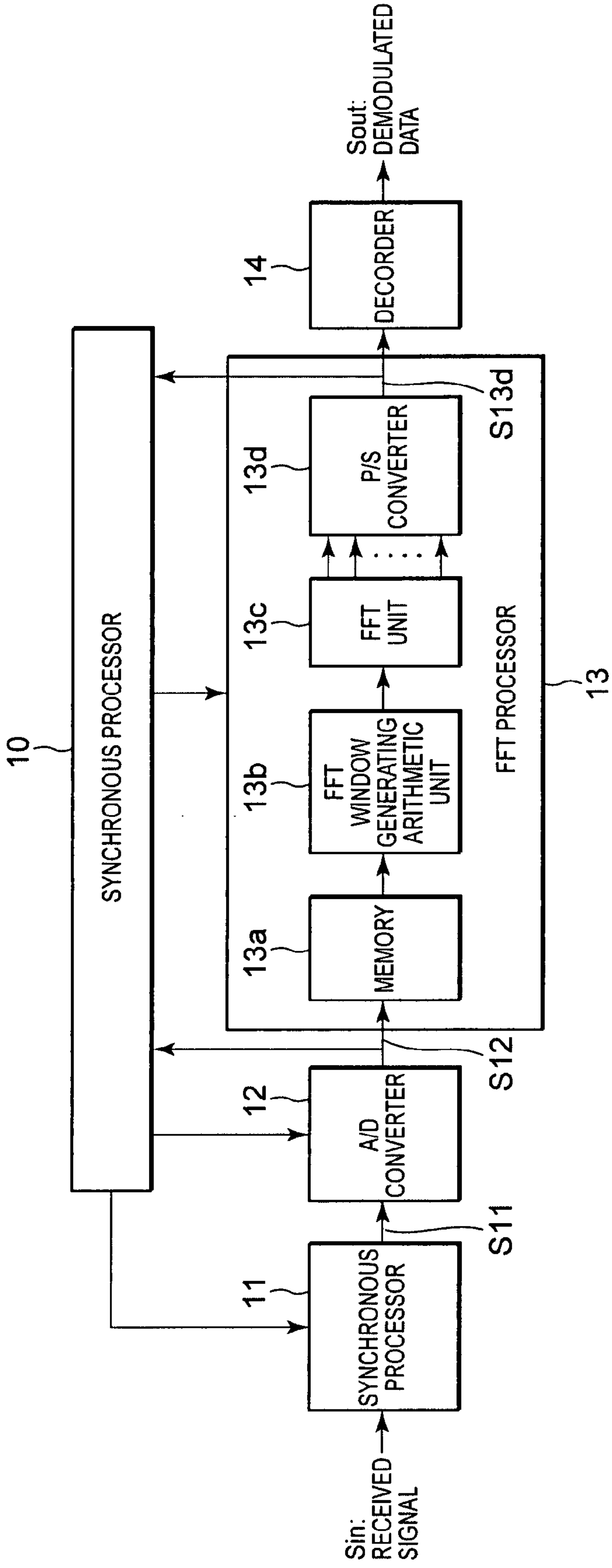
FIG. 1 is a schematic block diagram of a demodulating apparatus of the OFDM system showing the first embodiment of the present invention.

FIG. 1 is a schematic block diagram of the demodulating apparatus of the OFDM system showing the first embodiment of the present invention.

The demodulating apparatus of the present OFDM system has a synchronous processor 10 that controls its operating timing. A frequency converter 11 which converts the frequency of a received signal Sin and thereby outputs an analog baseband signal S11, an analog/digital (hereinafter called "A/D") converter 12 which converts the analog baseband signal S11 to a digital baseband signal S12, an FFT processor 13 which performs fast discrete Fourier transform processing on the digital baseband signal S12 to output received data S13*d* constituted of complex symbol data, a decoder 14 which decodes the received data S13*d* to output decoded data Sout, etc. are connected to the synchronous processor 10.

The FFT processor 13 includes a memory 13*a* which stores the digital baseband signal S12 corresponding to each received signal that is equivalent to the time length greater than or equal to the effective symbol S, an FFT window generating arithmetic unit 13*b* which generates an FFT input signal from the digital baseband signal S12 stored in the memory 13*a* using the spread FFT window 1, an FFT unit 13*c* which fast discrete Fourier transforms the FFT input signal to output parallel received data, and a parallel/serial (hereinafter called "P/S") converter 13*d* which converts the parallel received data to serial received data S13*d*.

Demodulating Method of First Embodiment

The feature of the demodulating method of the first embodiment is that the demodulating apparatus shown in FIG. 1 obtains a partial time diversity effect using received signal components which have not been used in the conventional decoding apparatus. The demodulating method will be explained below.

When such an OFDM-modulated transmission signal as shown in FIG. 1 is subjected to signal processing such as filtering and inputted as a received signal Sin, the received signal Sin is converted to its corresponding analog baseband signal S11 by the frequency converter 11. The converted analog baseband signal S11 is sampled by the A/D converter 12 and converted into its corresponding digital baseband signal (I signal and Q signal) S12 thereby. The converted received signal equivalent to the time length greater than an OFDM symbol is stored in the memory 13*a* provided in the FFT processor 13.

The FFT window generating arithmetic unit 13*b* of the FFT processor 13 performs the following FFT window generating arithmetic operation to use, as an FFT input signal, a received signal (i.e., signal of expanded or spread FFT window 1) contained in each of previous and subsequent spreading windows W1 and W2 continuous with a received signal corresponding to an effective symbol length W0 similar to the prior art in addition to such a received signal as shown in FIG. 1.

A received signal S13-1 obtained at the spreading window W1 located at the head of the received signal shown in FIG. 2 is added to its corresponding received signal S13-2 lying within the effective symbol S at a time position located backward by the effective symbol length W0, followed by being divided by two. Likewise, a received signal S13-3 obtained at the spreading window W2 located at the end of the received signal is added to its corresponding received signal S13-4 lying in the effective symbol S at a time position located forward by the effective symbol length W0, followed by being divided by two. Expressing these mathematically yields a equation (1).

$$\text{fft\_in}(T)=\begin{cases}\{\text{rx\_sig}(T)+\text{rx\_sig}(T+\text{fft\_t\_length})\}/2; & T\le \text{spr\_win\_size}\\ \text{rx\_sig}(T); & \text{spr\_win\_size}<T\le(\text{fft\_t\_length}-\text{spr\_win\_size})\\ \{\text{rx\_sig}(T-\text{fft\_t\_length})+\text{rx\_sig}(T)\}/2; & \text{fft\_t\_length}-\text{spr\_win\_size}<T\end{cases}\quad(1)$$

where fft_in(T): FFT input signal,

T: sampling time of received signal rx_sig(T): received signal fft_t_length: FFT input signal length (identical to effective symbol length W0)

spr_win_size: spreading windows W1 and W2 lengths

The FFT input signal fft_in(T) obtained by this arithmetic operation is fast discrete Fourier-transformed into parallel received data corresponding to respective subcarrers by the FFT unit 13*c* lying in the FFT processor 13. The P/S converter 13*d* converts the converted parallel received data into serial received data (complex symbol data) S13*d*.

The decoder 14 performs a waveform equalizing process for correcting transmission line characteristics, a QAM (Quadrature Amplitude Modulation) mapping process for detecting amplitude and phase information, a trellis decoding process and an error correcting process or the like on the converted serial received data S13*d* and thereby outputs decoded data Sout therefrom.

Advantageous Effects of First Embodiment

According to the first embodiment, the following advantageous effects of (a) through (b) are brought about.

(a) The effect of suppressing noise components contained in the spreading windows W1 and W2 to, for example, 3 dB by the received signals corresponding to the spreading windows W1 and W2 which have the same modulation signal component and on which uncorrelated noise components are superimposed, is produced, thereby making it possible to improve a reception characteristic.

(b) The received signals corresponding to the spreading windows W1 and W2 which have the same modulation signal component and on which the uncorrelated components are superimposed, relax a phase rotation of a modulation signal component due to fading and reduce the influence of ICI, thereby making it possible to enhance resistance to fading.

(c) When the demodulating method of the first embodiment is used in, for example, digital terrestrial broadcasting, a static characteristic can be improved 0.1 dB or more, a fading characteristic (maximum Doppler frequency) can be improved about 10%, and a long delay 2-path reception characteristic (delay time) can be improved about 10%.

Second Preferred Embodiment

Figure 3:
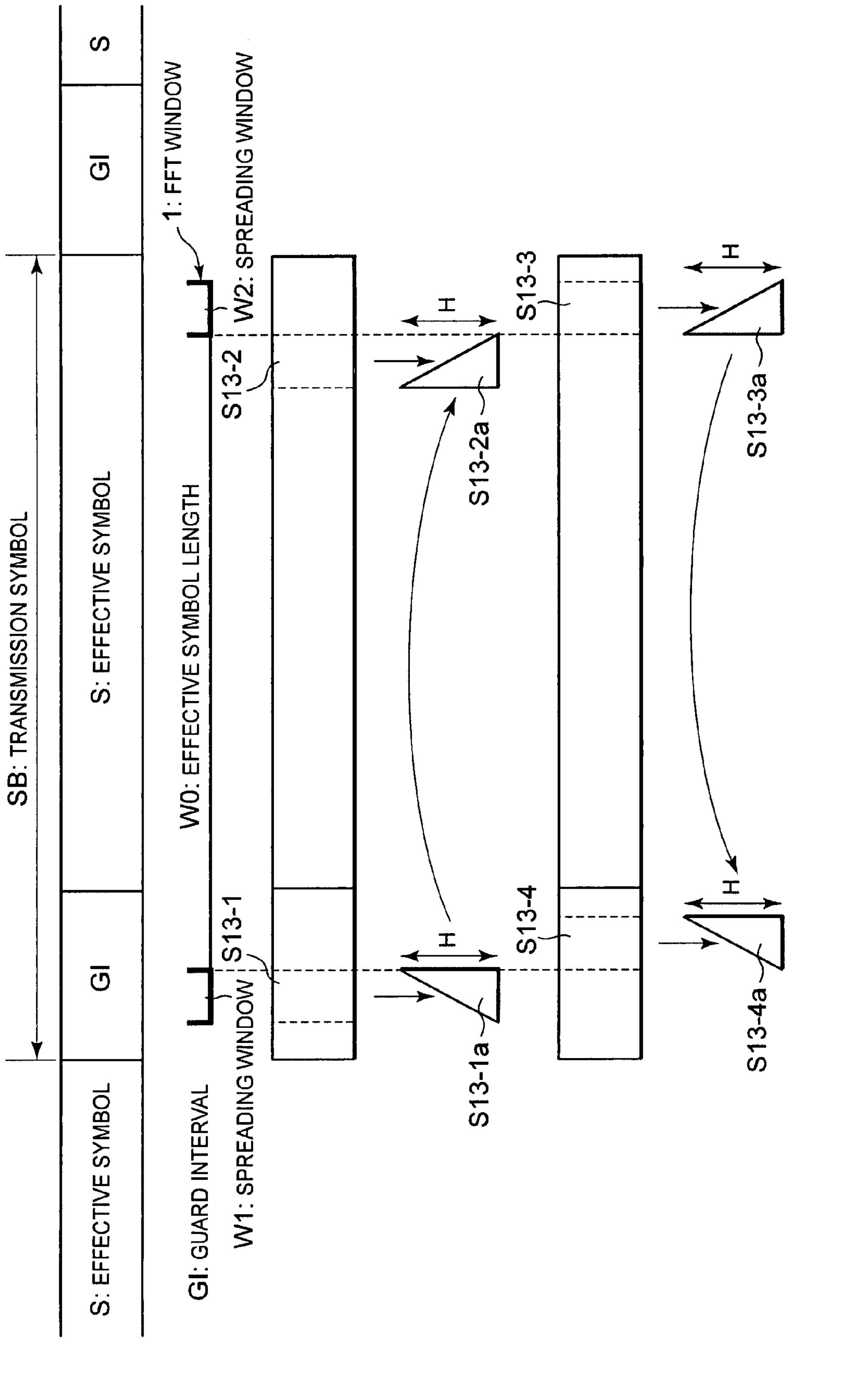
FIG. 3 is a frame configuration diagram of a transmission signal employed in an OFDM system showing a second embodiment of the present invention.

FIG. 3 is a frame configuration diagram of a transmission signal employed in an OFDM system showing a second embodiment of the present invention. Constituent elements common to those shown in FIG. 1 illustrative of the first embodiment are given common reference numerals respectively.

A frame configuration of the transmission signal according to the second embodiment is provided in a manner similar to the frame configuration of the first embodiment. Each of a plurality of transmission symbols SBs that constitute one frame is constituted of a guard interval GI and an effective symbol SB. The guard interval GI is equivalent to one in which the rear portion of a time waveform of each effective symbol S is extracted and copied onto its head.

In a manner similar to the first embodiment, the feature of the second embodiment is an FFT window spreading method for storing each receive signal equivalent to a time length greater than or equal to the effective symbol S into a memory and generating an FFT input signal using receive signals (i.e., an expanded or spread FFT window 1 added with spreading windows W1 and W2 at the head and end of an effective symbol length W0) corresponding to portions expanded or spread beyond the time length of the effective symbol S by an FFT window generating arithmetic operation on the basis of each receive signal stored in the memory.

A demodulating method suitable for use in the demodulating apparatus of the OFDM system of FIG. 1 using this FFT window spreading method will be explained below.

The feature of the demodulating method of the second embodiment is that the demodulating apparatus shown in FIG. 1 obtains a partial time diversity effect using received signal components which have not been used in the conventional decoding apparatus in a manner similar to the first embodiment. The demodulating method of the second embodiment is different from the demodulating method of the first embodiment in terms of the contents of arithmetic operation at the FFT window generating arithmetic unit 13*b* shown in FIG. 1. Therefore, the contents of its arithmetic operation will principally be explained for simplification of its description.

When such an OFDM-modulated transmission signal as shown in FIG. 3 is inputted as a received signal Sin in the demodulating apparatus shown in FIG. 1, the received signal Sin is processed by a frequency converter 11 and an A/D converter 12 in a manner similar to the first embodiment, so that the corresponding received signal equivalent to a time length greater than or equal to an OFDM symbol is stored in the corresponding memory 13*a* lying in an FFT processor 13.

The FFT window generating arithmetic unit 13*b* of the FFT processor 13 performs the following FFT window generating arithmetic operation to use, as an FFT input signal, a received signal (i.e., signal of spread or expanded FFT window 1) contained in each of previous and subsequent spreading windows W1 and W2 continuous with a received signal corresponding to an effective symbol length W0 similar to the first embodiment in addition to such a received signal as shown in FIG. 3.

A received signal S13-1 obtained at the spreading window W1 located at the head of the received signal shown in FIG. 3 is multiplied by a coefficient so as to assume or take an amplitude H (thus-obtained signal: S13-1*a*). A received signal 13-2 lying within the effective symbol S at a time position located backwards by the effective symbol length W0 is multiplied by a coefficient so as to assume or take an amplitude H (thus-obtained signal: S13-2*a*). Then, these signals are added together. Likewise, a received signal S13-3 obtained at the spreading window W2 located at the end of the received signal shown in FIG. 3 is multiplied by a coefficient so as to assume or take an amplitude H (thus-obtained signal: S13-3*a*). A received signal S13-4 lying within the effective symbol S at a time position located ahead by the effective symbol length W0 is also multiplied by a coefficient so as to assume or take an amplitude H (thus-obtained signal: S13-4*a*). Then, these signals are added together. Expressing these in the form of a mathematical formula yields an equation (2).

$$\text{fft\_in}(T)=\begin{cases}\text{rx\_sig}(T)*\alpha(T)+\text{rx\_sig}(T+\text{fft\_t\_length})*\{1-\alpha(T)\}; & T\le\text{spr\_win\_size}\\ \text{rx\_sig}(T); & \text{spr\_win\_size}<T\le(\text{fft\_t\_length}-spr\\ \text{rx\_sig}(T-\text{fft\_t\_lenght})*\{1-\alpha(\text{fft\_t\_length}-T)\}+\text{rx\_sig}(T)*\alpha(\text{fft\_t\_length}-T); & \text{fft\_t\_length}-\text{spr\_win\_size}<T\end{cases}\quad(2)$$

$$\alpha(T)=T/\text{spr\_win\_size}$$

where fft_in(T): FFT input signal,

T: sampling time of received signal rx_sig(T): received signal fft_t_length: FFT input signal length (identical to effective symbol length W0)

spr_win_size: spreading windows W1 and W2 lengths

The FFT input signal fft_in (T) obtained by this arithmetic operation is fast discrete Fourier-transformed into parallel received data corresponding to respective subcarrers by the corresponding FFT unit 13*c* lying in the FFT processor 13 in a manner similar to the first embodiment. Thereafter, the converted parallel received data is processed by the corresponding P/S converter 13*d* and decoder 14, so that demodulated data Sout is outputted.

Advantageous Effects of Second Embodiment

According to the second embodiment, the following advantageous effect (d) is brought about in addition to advantageous effects similar to the effects (b) and (c) of the first embodiment.

(d) When a long delay path which exceeds the guard interval GI and is smaller than a main incoming path in power difference is received based on the received signals corresponding to the spreading windows W1 and W2 having the same modulation signal component, desired received signals contained in the spreading windows W1 and W2 are effectively combined into one. Thus, a long delay path reception characteristic can be improved by reducing the influence of ISI.

Incidentally, the demodulating apparatus of the OFDM system shown in FIG. 1 can be changed to various configurations other than illustrated in the drawings.

The FFT window spread generating method of the present invention is not limited to the digital terrestrial broadcasting but applicable to all of ones using the OFDM modulation. An improvement in characteristic is strongly expected for these.

While the preferred forms of the present invention have been described, it is to be understood that modifications will be apparent to those skilled in the art without departing from the spirit of the invention. The scope of the invention is to be determined solely by the following claims.

What is claimed is:

1. An FFT window spread generating method comprising:

when OFDM-modulated received signals each having a time length greater than or equal to an effective OFDM symbol length are demodulated by FFT processing using a spread FFT window, combining the received signals located before and/or after the effective OFDM symbol length by a predetermined arithmetic operation in a FFT window generating arithmetic unit to generate the spread FFT window, and using the received signals each having the time length greater than or equal to the effective OFDM symbol length, providing spreading windows spread before and/or after the effective OFDM symbol length, adding together the received signals lying within the spreading windows to the received signals which correspond to the received signals lying within the effective OFDM symbol length and are different in time position by the effective OFDM symbol length, and reducing the amplitudes of the added received signals to half respectively, thereby generating the spread FFT window.

2. The FFT window spread generating method according to claim 1, further including storing the OFDM-modulated received signals each having the time length greater than or equal to the effective OFDM symbol length in a memory and generating the spread FFT window by the FFT window generating arithmetic unit using the stored received signals.

3. The FFT window spread generating method according to claim 1, wherein the predetermined arithmetic operation is:

$$\text{fft\_in}(T) = \begin{cases} (\text{rx\_sig}(T) + \text{rx\_sig}(T + \text{fft\_t\_length}))/2; & T \le \text{spr\_win\_size} \\ \text{rx\_sig}(T); & \text{spr\_win\_size} < T \le (\text{fft\_t\_length} - \text{spr\_win\_size}) \\ (\text{rx\_sig}(T - \text{fft\_t\_length}) + \text{rx\_sig}(T))/2; & \text{fft\_t\_length} - \text{spr\_win\_size} < T \end{cases}$$

where fft_in(T) is an FFT input signal,

T is a sampling time of a received signal, rx_sig(T) is the received signal, fft_t_length is an FFT input signal length identical to the effective symbol length W0, and spr_win_size is spreading windows W1 and W2.

4. An FFT window spread generating method comprising:

when OFDM-modulated received signals each having a time length greater than or equal to an effective OFDM symbol length are demodulated by FFT processing using a spread FFT window, combining the received signals located before and/or after the effective OFDM symbol length by a predetermined arithmetic operation in a FFT window generating arithmetic unit to generate the spread FFT window, and using the received signals each having the time length greater than or equal to the effective OFDM symbol length, providing spreading windows spread before and/or after the effective OFDM symbol length, multiplying the received signals which correspond to received signals lying within the effective OFDM symbol length and are different in time position by the effective OFDM symbol length, by window functions which are taken as coefficients not greater than 1 by the lengths of the spreading windows and have tilts with respect to time respectively, multiplying the received signals lying within the spreading windows by other coefficients obtained by subtracting 1 from the previous coefficients respectively, and adding together the two received signals multiplied by drift coefficients by the effective OFDM symbol length, thereby generating the spread FFT window.

5. The FFT window spread generating method according to claim 4, wherein the predetermined arithmetic operation is:

$$\text{fft\_in}(T) = \begin{cases} \text{rx\_sig}(T) * \alpha(T) + \text{rx\_sig}(T + \text{fft\_t\_length}) * \{1 - \alpha(T)\}; & T \le \text{spr\_win\_size} \\ \text{rx\_sig}(T); & \text{spr\_win\_size} < T \le (\text{fft\_t\_length} - spr \\ \text{rx\_sig}(T - \text{fft\_t\_lenght}) * \{1 - \alpha(\text{fft\_t\_length} - T)\} + \text{rx\_sig}(T) * \alpha(\text{fft\_t\_length} - T); & \text{fft\_t\_length} - \text{spr\_win\_size} < T \end{cases}$$

where fft_in(T) is an FFT input signal,

T is a sampling time of a received signal, rx_sig(T) is the received signal, fft_t_length is FFT input signal length an FFT input signal length identical to the effective symbol length W0, and spr_win_size is spreading windows W1 and W2.

6. The FFT window spread generating method according to claim 4, further including storing the OFDM-modulated received signals each having the time length greater than or equal to the effective OFDM symbol length in a memory and generating the spread FFT window by the FFT window generating arithmetic unit using the stored received signals.

* * * * *